(12) United States Patent
Bouchy et al.

(10) Patent No.: US 7,452,152 B2
(45) Date of Patent: *Nov. 18, 2008

(54) TENSION DECOUPLER DEVICE

(75) Inventors: Gael Bouchy, La Chapelle Iger (FR);
Pascal Vasseur, Vaux le Penil (FR)

(73) Assignee: Snecma, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/608,596

(22) Filed: Dec. 8, 2006

(65) Prior Publication Data

US 2007/0081852 A1    Apr. 12, 2007

Related U.S. Application Data

(62) Division of application No. 10/662,510, filed on Sep. 16, 2003, now Pat. No. 7,318,685.

(30) Foreign Application Priority Data

Sep. 26, 2002 (FR) .................................. 02 11894

(51) Int. Cl.
*F16D 9/00* (2006.01)

(52) U.S. Cl. ........................................................ 403/2

(58) Field of Classification Search ...................... 403/2, 403/337, DIG. 3; 285/2–4; 464/33; 416/2, 416/224 A, 244 R; 415/9, 229
See application file for complete search history.

(56) References Cited

U.S. PATENT DOCUMENTS

| 3,304,031 | A | 2/1967 | Mulquin |
|---|---|---|---|
| 3,348,429 | A | 10/1967 | Naegele et al. |
| 3,395,857 | A | 8/1968 | Pask et al. |
| 4,086,012 | A | 4/1978 | Buckley et al. |
| 4,543,074 | A | 9/1985 | Ville et al. |
| 4,691,988 | A | 9/1987 | Tremblay et al. |
| 4,894,043 | A | 1/1990 | Nixon, Jr. |
| 5,261,759 | A | 11/1993 | Decoux |
| 6,428,269 | B1 | 8/2002 | Boratgis et al. |
| 7,318,685 | B2 * | 1/2008 | Bouchy et al. .................. 403/2 |

FOREIGN PATENT DOCUMENTS

EP    0 723 093    7/1996

(Continued)

OTHER PUBLICATIONS

MSC Indsutrial Supply Co. Catalog, MSC Industrial Supply Co., Plainview NY, p. 1272, 1998.

(Continued)

*Primary Examiner*—Greg Binda
(74) *Attorney, Agent, or Firm*—Oblon, Spivak, McClelland, Maier & Neustadt, P.C.

(57) ABSTRACT

A tension decoupler includes first rupture members, arranged in parallel to each other, and second rupture members, arranged in parallel to each other and parallel to the first rupture members. The first rupture members and the second rupture members are designed to break only when the load applied to the decoupler device reaches or exceeds a predetermined load value, and the second rupture members are designed to have sufficient fatigue strength as long as the applied load does not reach the predetermined load value.

6 Claims, 8 Drawing Sheets

FOREIGN PATENT DOCUMENTS

| | | |
|---|---|---|
| FR | 1 447 644 | 6/1966 |
| FR | 2 752 024 | 2/1998 |
| GB | 565839 | 11/1944 |
| GB | 1127131 | 9/1968 |

OTHER PUBLICATIONS

Webster's Third New International Dictionary, Unabridged [online]. Merriam-Webster, Inc., [retrieved on Dec. 23, 2005]. Retrieved from the Internet URL: http://lionreference.chadwyck.com.

* cited by examiner

TENSION DECOUPLER DEVICE

CROSS REFERENCE TO RELATED APPLICATIONS

This application is a divisional of U.S. application Ser. No. 10/662,510, filed Sep. 16, 2003, now issued as U.S. Pat. No. 7,318,685 on Jan. 15, 2008, and is based upon and claims the benefit of priority from the prior French Patent Application No. 02 11894 filed on Sep. 26, 2002, the entire contents of each of which are incorporated herein by reference.

FIELD OF THE INVENTION

This invention relates to a tension decoupler device provided with screws intended for use particularly on a fan shaft bearing support in a turbojet.

DESCRIPTION OF THE RELATED ART

A tension decoupler device provided with screws has already been disclosed in document FR 2 752 024.

This document describes a bearing support that holds a roller bearing in place. The bearing support is fixed to an intermediate casing by a flange associated with a set of assembly screws all parallel to the engine center line.

When the bearing support is subjected to a large load due to an out of balance mass caused by the rupture of a blade, said load is no longer transmitted to the intermediate casing and then to the rest of the structure because it is prevented from doing so by the presence of a decoupler device placed between said bearing support and said intermediate casing.

A first embodiment of FR 2 752 024 specifies that decoupling takes place by rupture of assembly screws between the bearing support and the intermediate casing. This is achieved by providing a turned zone or a local zone of weakness on said screws. Such screws are called herein "frangible screws".

The decoupler device is composed of a combination of the flange and assembly screws.

A second embodiment of FR 2 752 024 specifies that decoupling should take place by rupture of a zone behind the bearing support close to the connection of said bearing support with the intermediate casing. This is achieved by providing a weakened zone in the rupture zone of the bearing support. In this case, assembly screws between the bearing support and the intermediate casing are ordinary screws and are not designed to break.

The out of balance mass applies a cyclic radial force to the shaft, which is converted into a cyclic axial force that acts in tension on the zone of weakness of the decoupler device, through the shape and the size of the bearing support. In the two embodiments of FR 2 752 024, the zone of weakness is adapted so that it will break when the applied load reaches or exceeds a predetermined load value, particularly through control of its dimensions.

In practice, it is not only desirable that the decoupler device should break under the effect of a large out of balance mass, but it is also often desirable that it should be capable of resisting a moderate out of balance mass for a given time.

In practice, a large out of balance mass may be caused by the loss of a blade, and in this case it is desirable that decoupling should take place; a moderate out of balance mass could be caused by ingestion of a bird by the turbojet, and in this case it is desirable that the decoupler device should resist this moderate out of balance mass to prevent decoupling from occurring too often.

When the decoupler device is subjected to a load greater than the predetermined load, it fails by rupture of the screws. But when it is subjected to a load less than said predetermined load, it does not fail but it may possibly be damaged if the load is large enough to cause local deterioration or deformations to its constituent elements (frangible screws and/or flange, and its life is reduced).

This fatigue strength condition should preferably be provided without affecting the robustness of the decoupler device.

With the decoupler device described in FR 2 752 024, the manufacturer does not have separate control over the fatigue strength of screws and their strength to pure tension before rupture. In other words, it is not possible to control the fatigue strength of this decoupler device, without also modifying its ultimate tensile strength. This is a major disadvantage in the decoupler device according to the prior art.

SUMMARY OF THE INVENTION

The present invention is an improvement to the first embodiment of the decoupler device described in document FR 2 752 024, which relates to a decoupler device with tensile stressed screws.

The aim of this invention is to provide a tension decoupler device that does not have the disadvantages of devices according to prior art mentioned above.

One purpose of the invention is to be able to increase the fatigue strength of a given decoupler device designed to fail when it is subjected to a given load.

According to the invention, the tension decoupler device connecting two parts of a structure and fitted with rupture members, the rupture of which cause decoupling of said parts when they break, is characterized in that it comprises:

a set of first rupture members arranged to be parallel to each other, a set of second rupture members arranged to be parallel to each other and parallel to the first rupture members, and in that said first rupture members and said second rupture members are designed to break only when the load applied to the decoupler device reaches or exceeds a given predetermined load value, and said second rupture members are designed to resist fatigue as long as said applied load does not reach said predetermined load value.

According to a preferred embodiment of the invention, the rupture members are frangible screws and structural screws.

According to one aspect of the invention, the decoupler device is characterized in that the first screws comprise a zone of weakness between their head and their thread, that acts as a trigger or initiation site for the tensile rupture.

According to another aspect of the invention, the shape of the second screws is thicker than said first screws, and their stiffness is greater.

According to another embodiment of the invention, the rupture members are frangible rivets and structural rivets.

According to still another embodiment of the invention, the rupture members are frangible bolts and structural bolts.

The decoupler device according to the invention has the advantage that it becomes possible for the manufacturer to design structures using lighter weight and/or less expensive materials, for example such as aluminum.

BRIEF DESCRIPTION OF THE DRAWINGS

Other aspects and advantages of the invention will become more apparent from the following description of a preferred, but not limitative embodiment, taken in conjunction with the accompanying in which.

DETAILED DESCRIPTION OF THE PREFERRED EMBODIMENTS

The invention will, now be described by illustrating a preferred embodiment in which the rupture members are frangible screws and structural screws.

Figure 1:
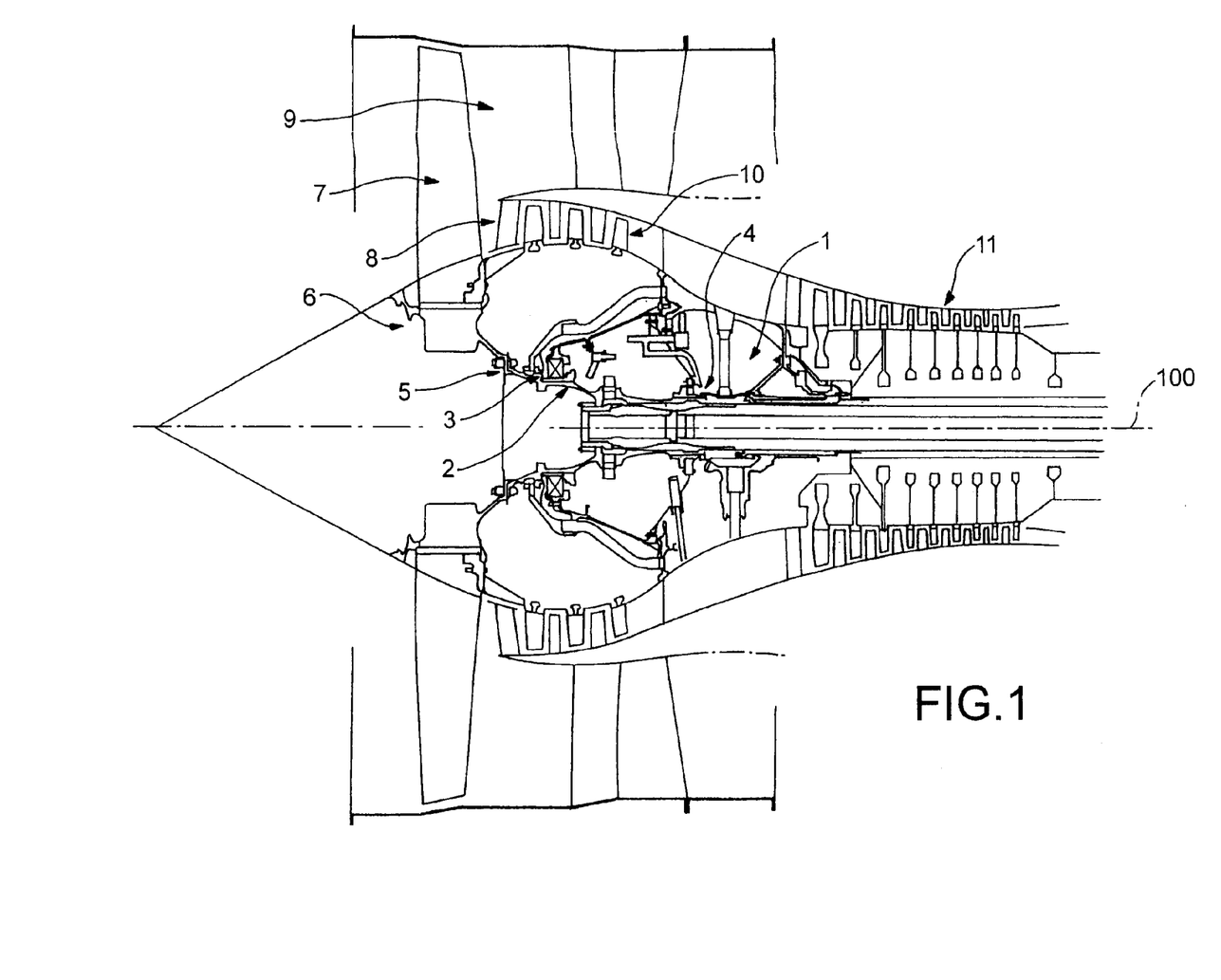
FIG. 1 is a longitudinal sectional view of a portion of a turbojet illustrating a general environment of the invention.
Figure 2:
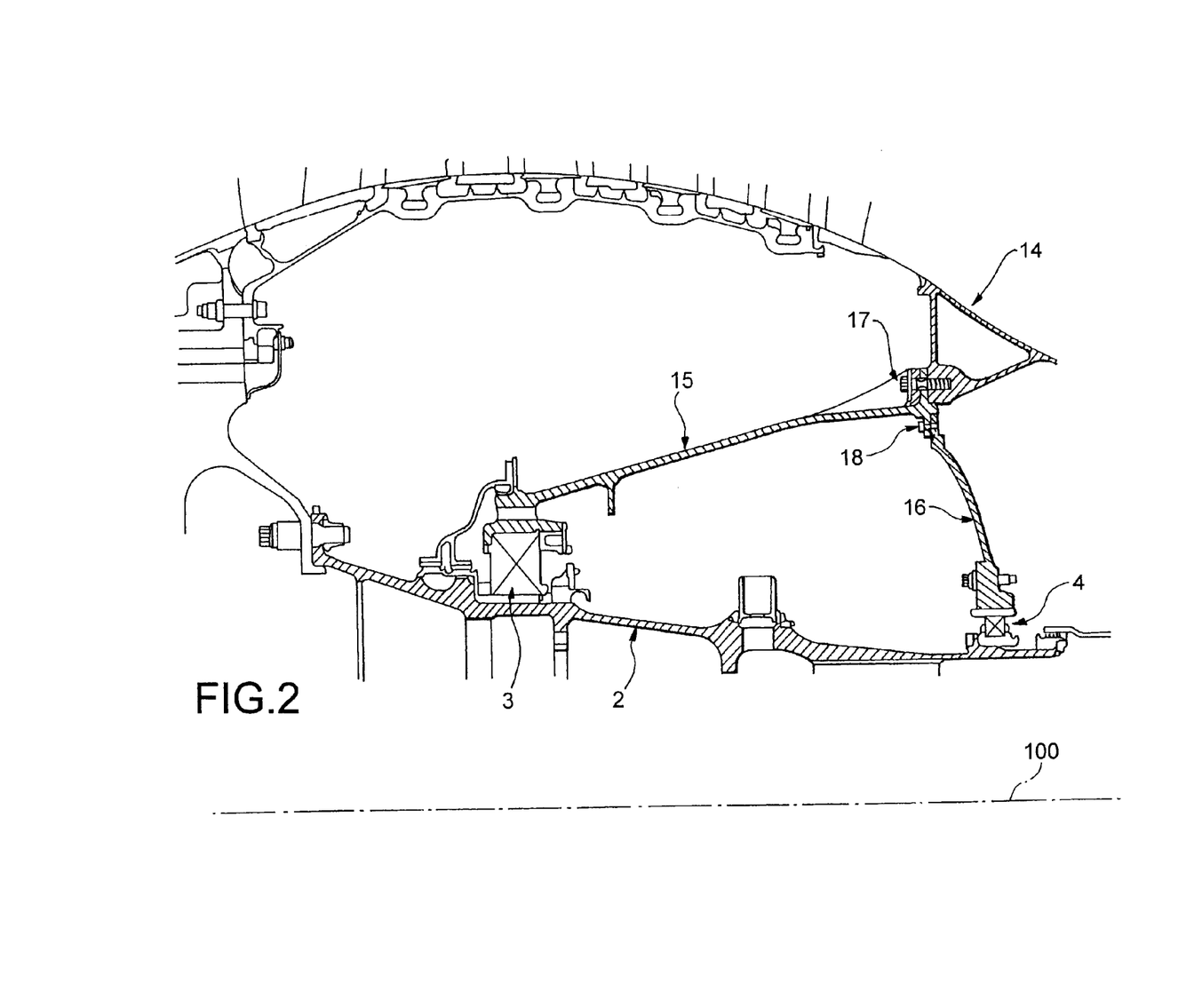
FIG. 2 is another longitudinal section showing an enlarged view of part of the previous figure, showing the embodiment of the invention in more detail.

FIGS. 1 and 2 illustrate an example environment in which the decoupler device according to the invention can be used.

With reference firstly to FIG. 1, a fan 6 of a turbojet with a center line 100, driven and supported by a rotating shaft 2, is located in front of a low pressure shaft line 1. The fan 6 is fitted with blades 7 that extend in front of the inlet of an internal stream 8 or a main gas flow stream, in front of the inlet of an external stream 9 surrounding the internal stream 8 along which gas dilution air passes. A low pressure compressor 10 and a high pressure compressor 11 are located in the internal stream 8.

The rotating shaft 2 supports the fan 6 at its front end 5 and extends backwards starting from the fan 6, the shaft 2 being supported by a first bearing 3 behind the fan 6 and by a second bearing 4 behind the first bearing 3.

Now with reference to FIG. 2, the first bearing 3 is supported by a casing 15 surrounding the shaft 2 and extending backwards from the first bearing 3 as far as an intermediate casing 14, to which the casing 15 is connected through a link 17. The rear bearing 4 is supported by a support 16, itself connected to the casing 15 through a link 18.

If a blade 7 of the fan 6 breaks, a large out of balance mass is created on shaft 2, which generates cyclic loads and vibrations that are transmitted to the fixed parts of the machine through the first support bearing 3 of the shaft 2, creating serious risks of deterioration.

The link 18 between the casing 15 and the support 16 of the rear bearing 4 is made by an assembly of standard screws.

The link 17 between the casing 15 and the intermediate casing 14 is made using a decoupler device according to the present invention.

Figure 3A:
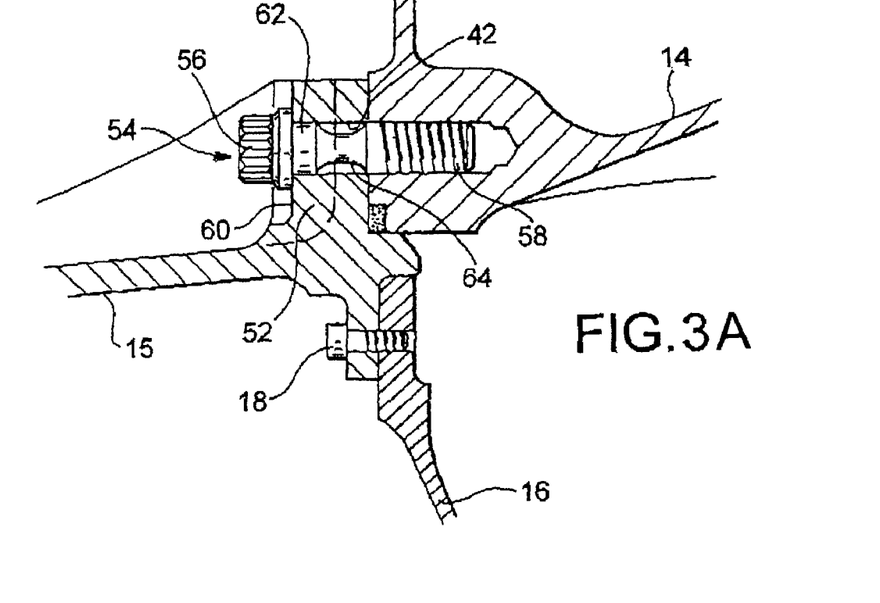
FIG. 3A illustrates a longitudinal section of a frangible screw according to the invention.

This decoupler device will be described with reference to FIGS. 3 and 4. It comprises a flange 52 fixed to the back end of the casing 15.

The flange 52 is approximately circular in shape and is centered on the center line 100, and is arranged approximately perpendicular to said center line 100.

The flange 52 is provided with first through orifices 42 in which the first assembly screws 54 are inserted, and second through orifices 44 in which second assembly screws 72 are inserted. The dimensions of the through orifices 42, 44 are actually appropriate for the dimensions of the screws 54 and 72 that fit into them.

The flange 52 is sized such that the force transmitted to the screws is a pure tension force.

The screws 54, 72 form the decoupling means of the decoupler device. They are of two different types, and their shapes and dimensions are different so that they can fulfill different functions.

A first screw assembly is composed of screws called frangible screws 54 that are sized to break in response to a given tension load.

They are illustrated in FIG. 3A and they are substantially similar to the frangible screws described in FR 2 752 024. They are arranged to be parallel to each other.

Figure 3B:
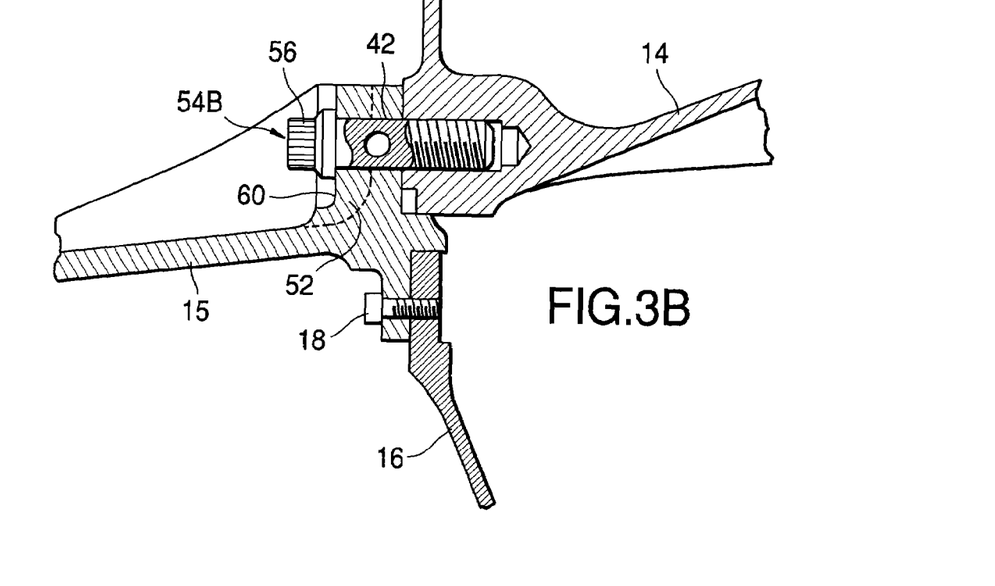
FIG. 3B illustrates a longitudinal section of an alternative frangible screw according to the invention.
Figure 3C:
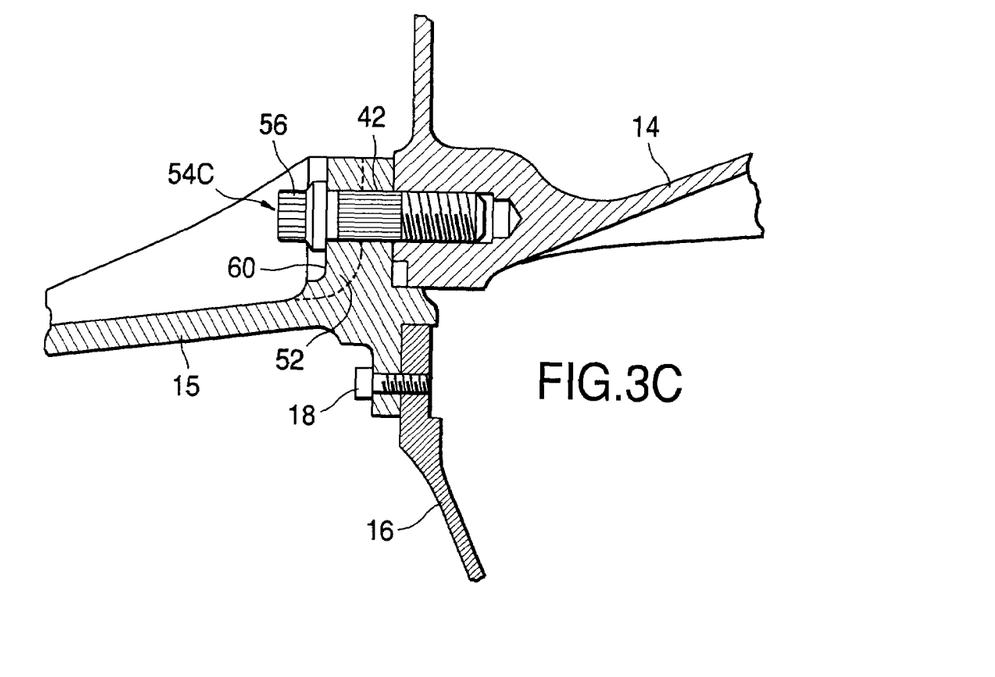
FIG. 3C illustrates a longitudinal section of an alternative frangible screw according to the invention.

The frangible screws 54 have a screw head 56, a thread 58, a smooth part 62 between the head 56 and the thread 58, and a zone of weakness or weakened zone, also called a frangible zone 64, sized as a function of the value of the predetermined load at which said frangible screws 54 are required to break. In use, the thread 58 of the frangible screws 54 is fitted in a tapping in the intermediate casing 14 and their head 56 rests on a free surface 60 of the flange 52. In use, the frangible zone 64 is always located inside the through orifice 42 of the flange 52 in which the frangible screw 54 is fitted. For example, the frangible zone 64 may be obtained by a restriction in the diameter, as illustrated on FIG. 3A. It can also be obtained by drilling, as illustrated in FIG. 3B, which shows frangible screw 54B. Further, a frangible zone may be obtained by weakening the ultimate mechanical strength by applying a particular treatment to it, for example such as a local heat treatment of screw 54C by local dipping, as illustrated in FIG. 3C.

A second screw assembly is composed of screws called structural screws 72. They are arranged to be parallel to each other and parallel to the frangible screws 54. These screws are also sized so that they break in response to a given tension load, but also to resist as long as said load does not exceed a given predetermined value. Therefore, the structural screws 72 are more capable of resisting fatigue for a given applied load value than the frangible screws 54.

Figure 4:
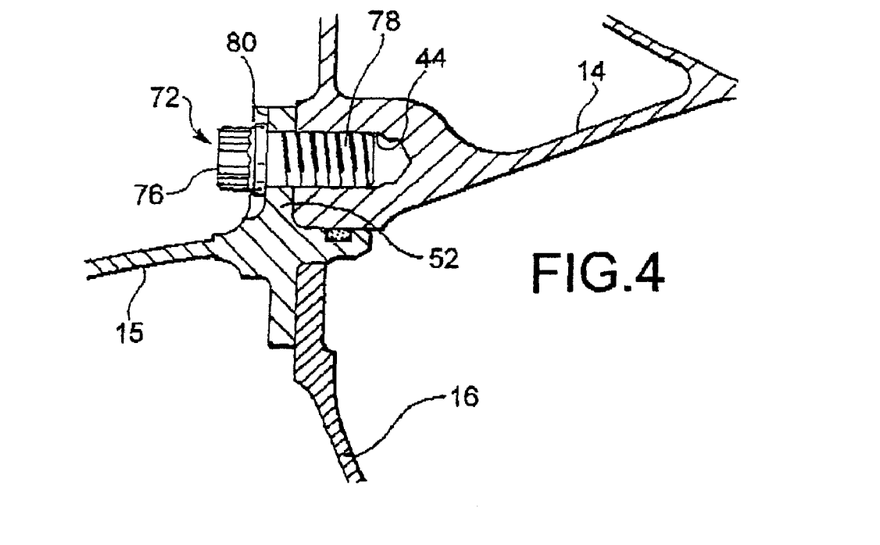
FIG. 4 illustrates a longitudinal section showing the flange and a structural screw according to the invention.

The structural screws 72 are illustrated in FIG. 4. They have a screw head 76 that rests on a free surface 80 of the flange 52 and a thread 78. Unlike the frangible screws 54, they do not have a zone of weakness, and therefore their thread 78 preferably extends substantially over the entire length of the screw body. In use, the threads 78 of the structural screws 72 are fitted in a tapping in the intermediate casing 14 and their heads 76 are supported on a free surface 80 of the flange 52.

The structural screws 72 are thicker than the frangible screws 54, and in particular their screw body diameters are greater than, the diameters of the frangible screws 54. Their stiffnesses are also higher than the stiffnesses of the frangible screws 54, for example they may be twice as high.

The forces originating from shaft 2 are transmitted mainly through the structural screw 72 to the intermediate casing 14.

The forces transmitted are mainly in the axial direction, shear forces being resisted mainly by the alignment of structural screws 72.

Now will be described details of the behavior of the decoupler device according to the invention in various possible situations, and in comparison with prior art.

Starting by considering a first situation in which the structure is subjected to the effect of a moderate out of balance mass, the applied load being less than the predetermined load that will cause rupture of the decoupler device. With a decoupler device according to prior art, in other words in the absence of the structural screws 72, the frangible screws 54 will be elongated by elastic deformation and then possibly plastic deformation under the effect of the axial tension stress, without this deformation causing rupture of the frangible screws 54. If the plastic deformation of the frangible screws 54 is large, the flange 52 may deform in turn and/or separate from the intermediate casing 14, which reduces the mechanical strength of the decoupler device. With a decoupler device according to the invention, in other words comprising a combination of frangible screws 54 and structural, screws 72, the structural, screws 72 will only be slightly elongated or will not be elongated at all. This prevents, or at least limits, deformation and/or separation of the flange 52.

Consequently, the presence of the structural screws 72 has the effect of improving the fatigue strength of the decoupler device and increasing its life provided that the applied load remains less than the predetermined load that causes rupture of the frangible screws 54.

Considering now a second situation in which the structure is subjected to the effect of a large out of balance mass, the applied load being greater than or equal to the predetermined load that causes rupture of the decoupler. With a decoupler device according to prior art, in other words in the absence of structural screws 72, there will be an elongation of the frangible screws 54 by plastic deformation under the effect of the axial tension force, until rupture of said frangible screws 54, in accordance with the description given in FR 2 752 024. With a decoupler device according to the invention, in other words including both frangible screws 54 and structural screws 72, there will be an elongation of the frangible screws 54 and the structural screws 72 by plastic deformation under the effect of the axial tension force, if the applied load is greater than or equal to the value of the predetermined load. The result is separation of the flange 52, which consequently causes a sudden load in the frangible screws 54. These screws then fail one after the other or simultaneously. The result is that the structural screws 72 are overloaded and fail in turn. Decoupling takes place.

Consequently, the presence of the structural screws 72 does not hinder the role of the decoupler device when it is subjected to a load greater than the predetermined load that causes rupture.

In decoupler devices according to prior art, the elastic rupture limit of the decoupler device in provided by the elastic rupture limit of the frangible screws. In decoupler devices according to the invention, the elastic rupture limit of the decoupler device is increased by the elastic rupture limit of the structural screws. For example, the frangible screws 54 and the structural screws 72 can be sized such that the elastic rupture limit of the device according to the invention is 40% greater than the elastic rupture limit of the decoupler device according to prior art.

It has been seen that the frangible screws 54 are sized so as to predetermine the value of the axial tension force, and therefore the load applied on the input side that causes decoupling. Moreover, the frangible screws 54 and the structural screws 72 are pretightened during their installation by an appropriate value, such that the structural screws 72 do not fail before the frangible screws 54.

One important aspect of decoupler devices according to the invention is in the roles of the frangible screws and structural screws. In devices according to prior art, rupture of the decoupler device is caused by rupture of the frangible screws, and the fatigue limit of the decoupler device is given by separation of the flange held by the same frangible screws. In decoupler devices according to the invention, rupture of the decoupler device still depends on rupture of the frangible screws 54, while the fatigue limit of the decoupler device depends on separation of the flange held in place by the structural screws 72.

Consequently, with a decoupler device according to the invention, comprising both frangible screws 54 and structural screws 72, it is advantageously possible to control rupture of the decoupler device and the fatigue limit of the decoupler device separately.

Now will be described examples of the arrangement and distribution of frangible screws 54 and structural screws 72 in relation to FIGS. 5 to 7.

Preferably, the center line of the through orifices 42 provided for the first frangible screws 54 and the through orifices 44 provided for the second structural screws 72 are located around an average circular line 40, 140, 240, 340, 440 of the flange 52, 152, 252, 352, 452, with an alternating distribution, as illustrated on FIGS. 5, 6, 7, 8 and 9, respectively.

Figure 5:
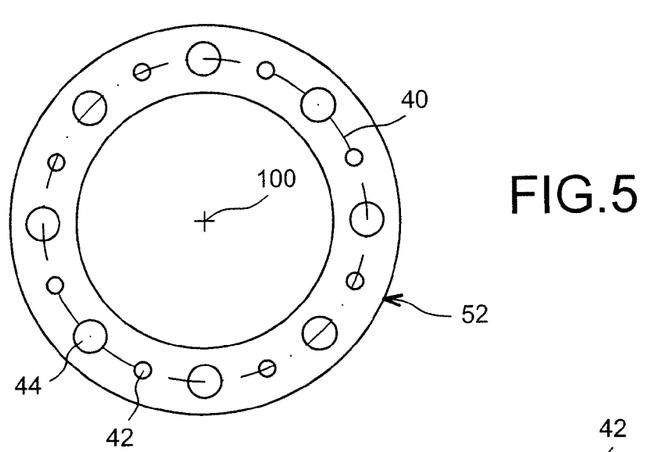
FIGS. 5, 6, 7, 8 and 9 illustrate variant distributions of frangible screws and structural screws around the periphery of the flange.

According to a first variant embodiment illustrated on FIG. 5, said alternating distribution is such that each orifice 42 for frangible screws 54 is located between two orifices 44 for structural screws 72, and similarly each through orifice 44 for structural screws 72 is located between two through orifices 42 for frangible screws 54.

Figure 6:
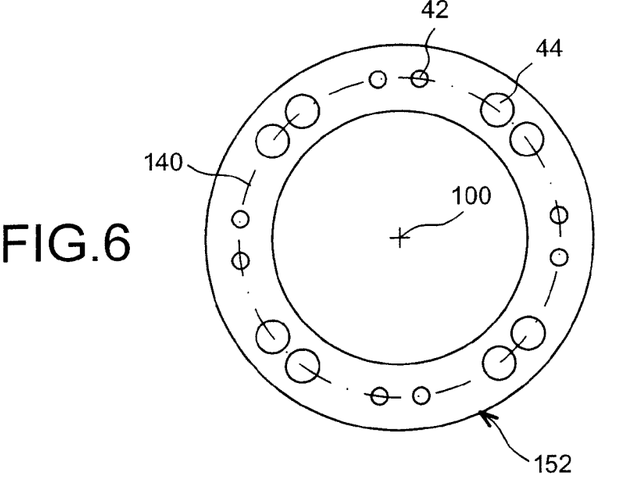

According to a second variant embodiment illustrated in FIG. 6, said alternating distribution is such that the through orifices 42 for frangible screws 54 and the through orifices 44 for structural screws 72 are grouped, in pairs, each pair of through orifices 42 for frangible screws 54 being located between two pairs of through orifices 44 for structural screws 72, and similarly each pair of through orifices 44 for structural screws 72 being located between two pairs of through orifices 42 for frangible screws 54.

Actually, other variants of the alternation of through orifices 42 for frangible screws 54 and through orifices 44 for structural screws 72 could be envisaged.

According to one variant (not shown), the distribution of screws may be made with zones of several frangible screws 54 alternating with zones of several structural screws 72.

Figure 7:
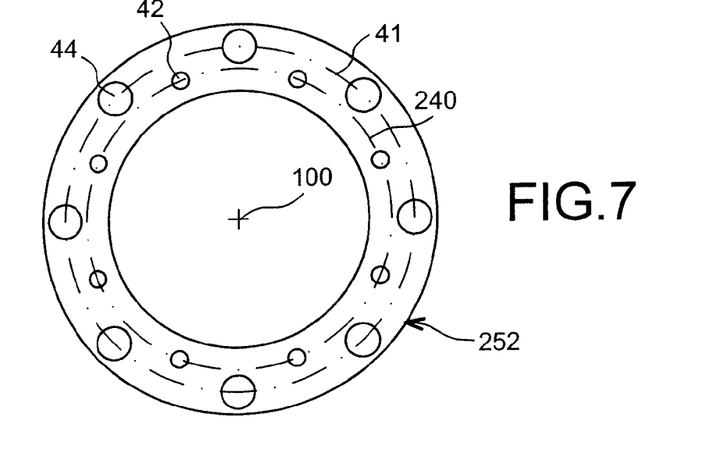

According to a third variant embodiment illustrated on FIG. 7, said alternating distribution is such that the through orifices 42 for frangible screws 54 are distributed on a first average line 240 of the flange 52, and the through orifices for structural screw 72 are distributed on a second average line 41 of the flange 52, the second average line 41 being concentric with the first average line 240, working towards or away from the center line 100.

Other distribution methods could also be considered combining variant alternations and/or increased distance from the center line 100.

Figure 8:
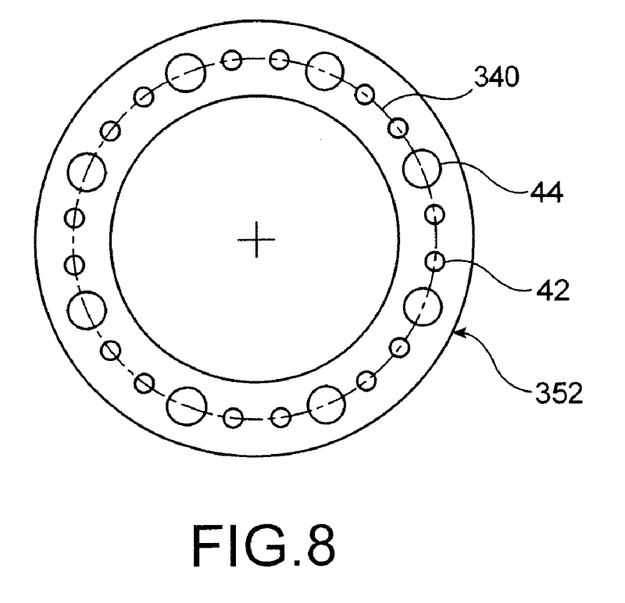
Figure 9:
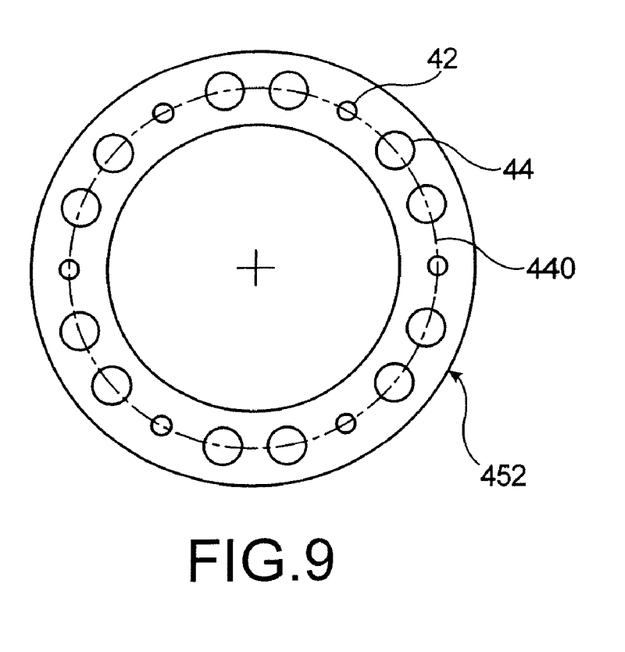

Furthermore, although three variant distributions have just been described in which the number of frangible screws 54 and the number of structural screws 72 are identical, it would also be possible to envisage other variant distributions in which the number of frangible screws 54 is larger than the number of structural screws 72, as illustrated in FIG. 8, or in which the number of frangible screws 54 is less than the number of structural screws 72, as illustrated in FIG. 9.

The choice of the method of distribution of the two types of screws and/or the choice of the number of screws is always made as a function of the required effects.

Figure 10:
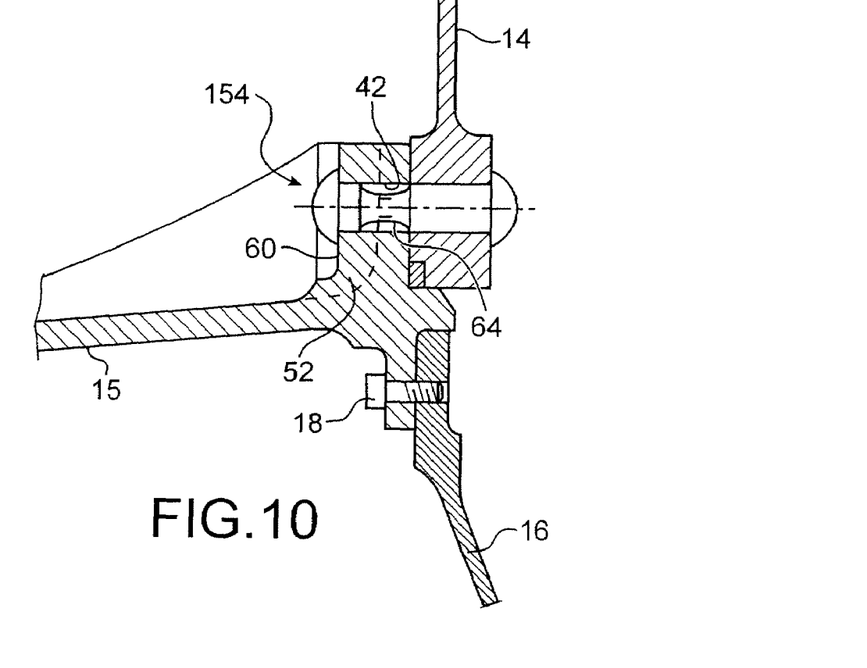
FIGS. 10 and 11 illustrate an alternative embodiment of the invention, according to which the rupture members are frangible rivets and structural rivets.
Figure 11:
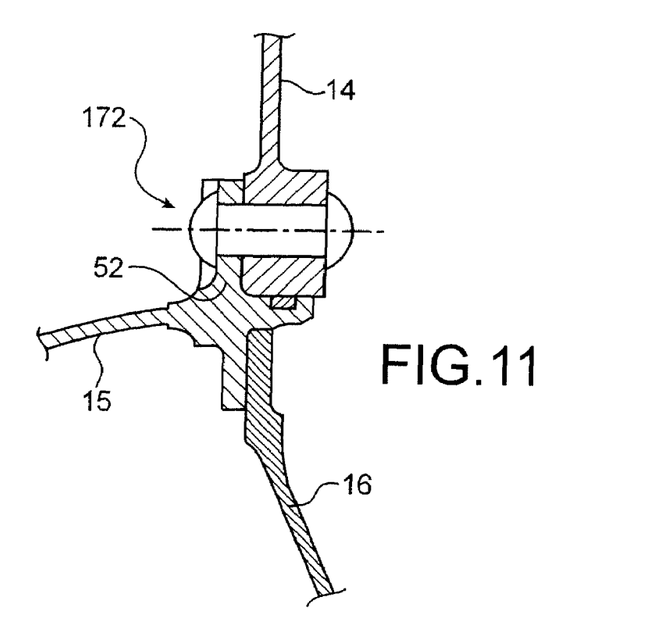
Figure 12:
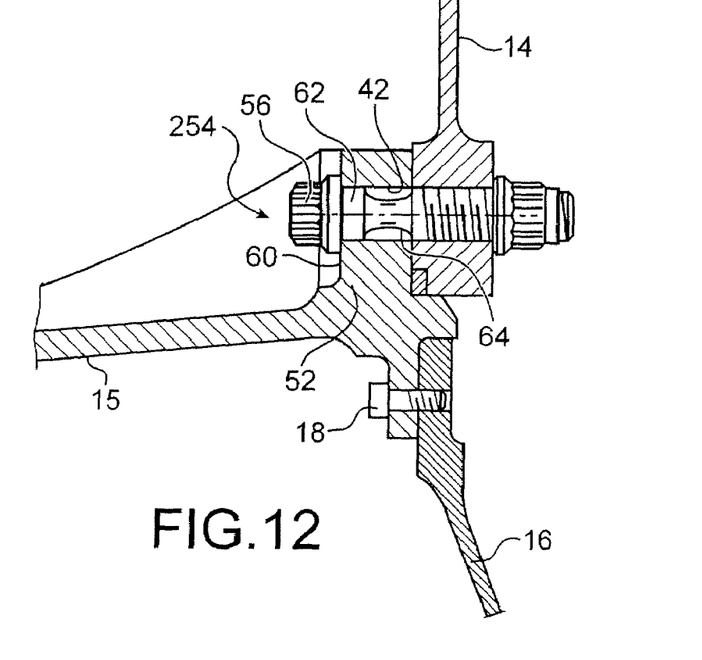
FIGS. 12 and 13 illustrate yet an alternative embodiment of the invention, according to which the rupture members are frangible bolts and structural bolts.
Figure 13:
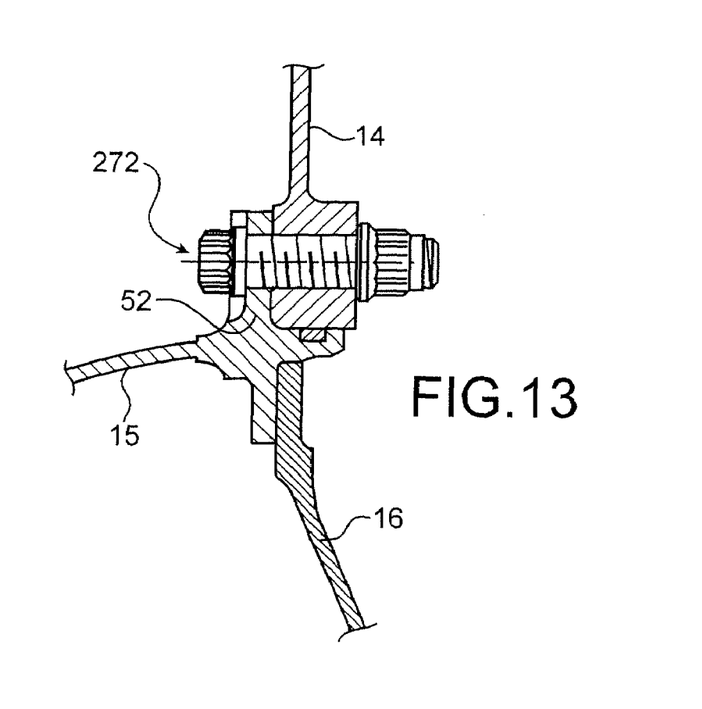

The invention that has just been described is not limited to a decoupler device in which parts are assembled by frangible screws and structural screws, but it may also be extended to include other embodiments in which sets of frangible rivets 154 (see FIG. 10) and structural rivets 172 (see FIG. 11), or sets of frangible bolts 254 (see FIG. 12) and structural bolts 272 (see FIG. 13), are used as the decoupling means instead of screws.

What is claimed is:

1. A tension decoupler device connecting two parts of a structure and fitted with rupture members, the rupture of which causes decoupling of said parts when they break, the decoupler comprising:
   a first tension transmitting element connected to a first part of said structure, said first tension transmitting element configured to apply a tension load to said first part of said tension decoupler device;
   a second tension transmitting element connected to a second part of said structure, said second tension transmitting element configured to apply the tension load to said second part of said tension decoupler device;
   a set of first rupture members arranged parallel to each other; and
   a set of second rupture members arranged parallel to each other and parallel to the first rupture members,
   wherein each first rupture member is designed to break at a first predetermined individual member tension load value, each second rupture member is designed to break only at a second predetermined individual member tension load value which is higher than said first predetermined individual member tension load value, said second rupture members are designed to resist fatigue as long as a tension load on each of said first rupture members does not reach said first predetermined individual member tension load value, and said first and second parts of said tension decoupler device are coupled together by said set of first rupture members and said set of second rupture members.

2. The decoupler device according to claim 1, wherein a number of first rupture members is greater than a number of second rupture members.

3. The decoupler device according to claim 1, wherein a number of first rupture members is less than a number of second rupture members.

4. The decoupler device according to claim 1, wherein the first rupture members and the second rupture members are distributed around a circular flange and the first rupture members and the second rupture members follow a regular alternating distribution along at least one average line of said flange.

5. The decoupler device according to claim 4, wherein the first rupture members are grouped in pairs and the second rupture members are grouped in pairs, and each pair of first rupture members is located between two pairs of second rupture members.

6. The decoupler device according to claim 4, wherein all the first rupture members are located on a first average line of the flange and all the second rupture members are located on a second average line of the flange, both average lines being concentric.

* * * * *